US012629241B2

(12) United States Patent
Pinarbasi

(10) Patent No.: US 12,629,241 B2
(45) Date of Patent: May 19, 2026

(54) FIXABLE DEGASSING TROCAR

(71) Applicant: SELCUKLU VETERINER HAYVANCILIK ITH. IHRA. TIC. SAN. LTD. STI., Sivas (TR)

(72) Inventor: Burhan Pinarbasi, Sivas (TR)

(73) Assignee: SELCUKLU VETERINER HAYVANCILIK ITH. IHRA. TIC. SAN. LTD. STI., Sivas (TR)

( * ) Notice: Subject to any disclaimer, the term of this patent is extended or adjusted under 35 U.S.C. 154(b) by 972 days.

(21) Appl. No.: 17/632,510

(22) PCT Filed: Aug. 25, 2020

(86) PCT No.: PCT/TR2020/050765

§ 371 (c)(1),
(2) Date: Feb. 3, 2022

(87) PCT Pub. No.: WO2021/040663

PCT Pub. Date: Mar. 4, 2021

(65) Prior Publication Data

US 2022/0287813 A1 Sep. 15, 2022

(30) Foreign Application Priority Data

Aug. 29, 2019 (TR) ................................ 2019/13115

(51) Int. Cl.
*A61D 1/14* (2006.01)
*A61B 17/34* (2006.01)

(52) U.S. Cl.
CPC ..................................... *A61D 1/14* (2013.01)

(58) Field of Classification Search
CPC .................. A61D 1/14; A61B 17/3415; A61B 2017/3492; A61B 17/3421; A61B 2017/3437
See application file for complete search history.

(56) References Cited

U.S. PATENT DOCUMENTS

| | | | | |
|---|---|---|---|---|
| 3,127,894 A * | 4/1964 | Smith | A61D 1/00 604/249 |
| 5,330,497 A * | 7/1994 | Freitas | A61B 17/34 604/164.12 |
| 8,435,174 B2 * | 5/2013 | Cropper | A61B 17/3421 600/203 |
| 2011/0144440 A1 * | 6/2011 | Cropper | A61B 17/3421 600/203 |

FOREIGN PATENT DOCUMENTS

| | | | | |
|---|---|---|---|---|
| CN | 104586529 A | 5/2015 | |
| WO | WO-2007019117 A1 * | 2/2007 | A61B 17/3421 |
| YU | 88403 A | 5/2006 | |

* cited by examiner

*Primary Examiner* — Chelsea E Stinson
*Assistant Examiner* — Hamza A Darb
(74) *Attorney, Agent, or Firm* — Jose Cherson Weissbrot

(57) ABSTRACT

This invention is a degassing cannula for veterinary use and refers to a stationary or fixable trocar used to release the gas that builds up in the stomach of farm animals and provide medication, water and food to the animal during or after the treatment.

3 Claims, 8 Drawing Sheets

FIXABLE DEGASSING TROCAR

TECHNICAL FIELD

Figure 1:
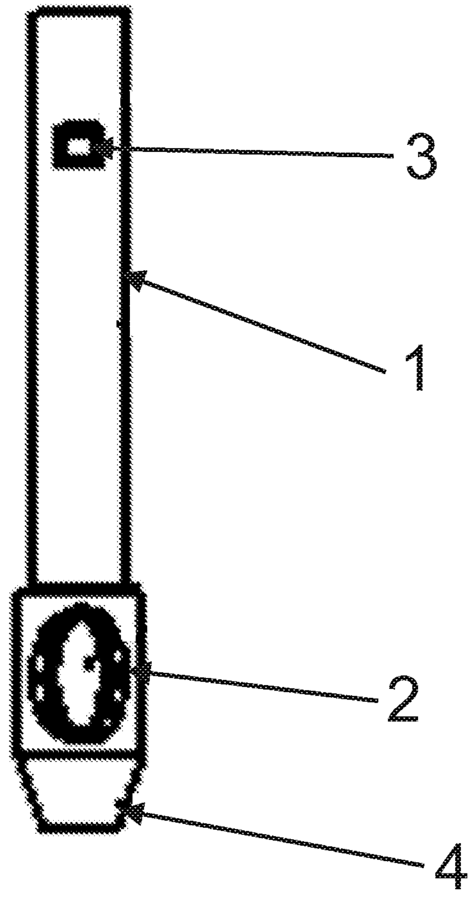

This invention is a degassing cannula for veterinary use and refers to a stationary or fixable trocar used to release the gas that builds up in the stomach of farm animals and provide medication, water and food to the animal during or after the treatment.

PRIOR ART

Overfeeding as well as the intake of frothy, gaseous green grass lead to obstructions in animals. Sudden changes to their diet may also cause bloating in animals. If not released, the gas that builds up in the stomach of an animal due to obstructions and bloating may result in death from asphyxiation. This is colloquially known as "bursting". This condition may recur in animals and this causes loss of business and time both for the veterinarians and the animal owners.

Therefore, various improvements have been made in the prior art in order to eliminate the bloating in animals.

In the prior art, the US patent document numbered U.S. Pat. No. 3,045,677 refers to an inflatable balloon catheter. This catheter comprises a main frame and 2 balloon elements located on the main frame. These balloon elements are located on the main frame in deflated state before use. The balloons are inflated by means of pulling the main frame outwards and pushing the balloon elements inwards.

In the prior art, the US patent document numbered U.S. Pat. No. 8,048,027 refers to a safety trocar assembly incorporating an airbag. The safety trocar assembly is developed to prevent overpenetration through an abdominal wall and into a body cavity. The safety trocar assembly comprises an airbag cannula having an expandable airbag proximal of the distal end of the cannula. These airbags are inflated by means of sliding over the main frame.

In the prior art, the Turkish patent document numbered 2016/12770 refers to a trocar having a flexible cannula used in laparoscopic surgery, which comprises mainly the handle, the cannula, the air duct and the blade. It is characterized in that the part of the cannula inside the body comprises a cannula with flexible part as it is produced from a flexible material in order to increase the mobility inside the body and operating limits. Additionally, the outer surface of the helical cannula will create an effect to reduce tissue trauma and the safety blade casing will protect inadvertent injuries.

Trocars in the prior art comprise simple tubing that allow penetration into the stomach with a drill shaft characterized in that they are removed after the procedure or temporarily stitched onto the skin. This leads to certain inconveniences such as having to penetrate through the stomach and the skin in recurrent cases of bloating as well as leakage of content through the hole to the abdominal cavity and infection. This has therefore given rise to the need to develop a trocar which allows constant access to the stomach without having to perform procedures repeatedly while at the same time preventing leakage or infection.

OBJECTIVES OF THE INVENTION

The objective of this invention is to develop a trocar which allows constant access to the stomach without having to perform procedures repeatedly while at the same time preventing leakage or infection.

Another objective of this invention is to develop a trocar that can be fixed inside the stomach and on the skin by means of the slit flaps on its outer tube.

Another objective of this invention refers to a stationary or fixable trocar used to release the gas that builds up in the stomach of animals and provide medication, water and food to the animal during or after the treatment.

DETAILED DESCRIPTION OF THE INVENTION

For the achievement of the objectives of this invention, the fixable degassing trocar is shown in the figures attached.

These figures;

FIG. 1: Front schematic view of the inner tube located on the trocar

Figure 2:
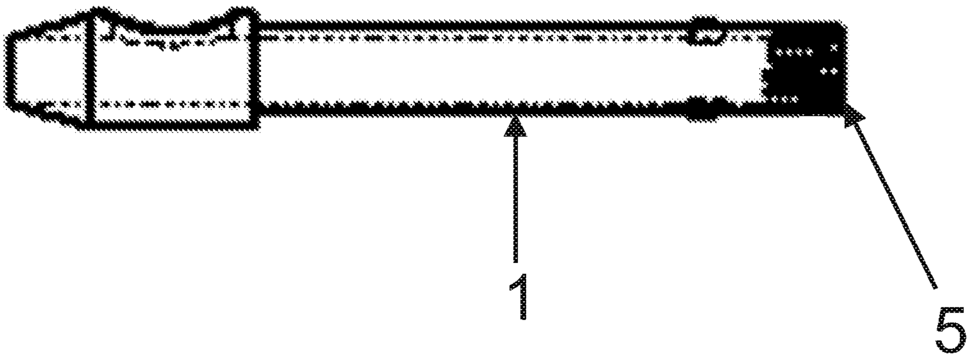

FIG. 2: Side schematic view of the inner tube located on the trocar

Figure 3:
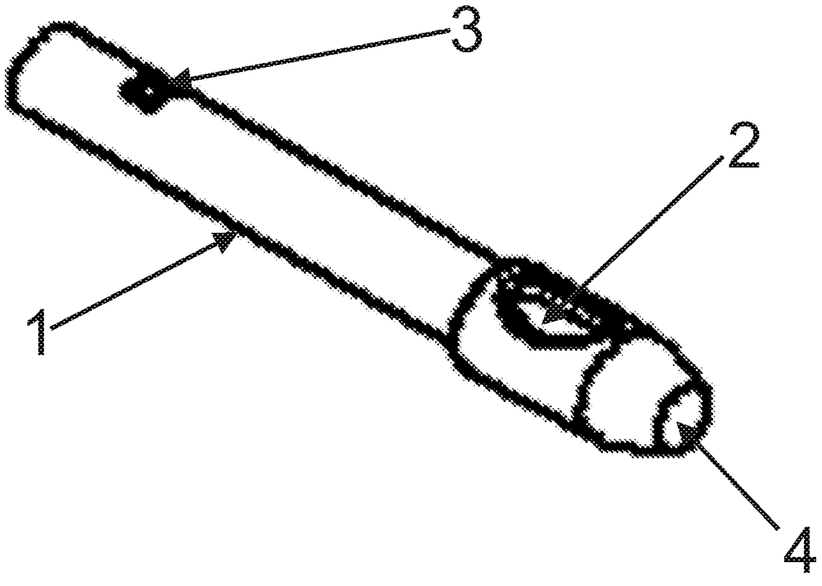

FIG. 3: Perspective view of the inner tube located on the trocar

Figure 4:
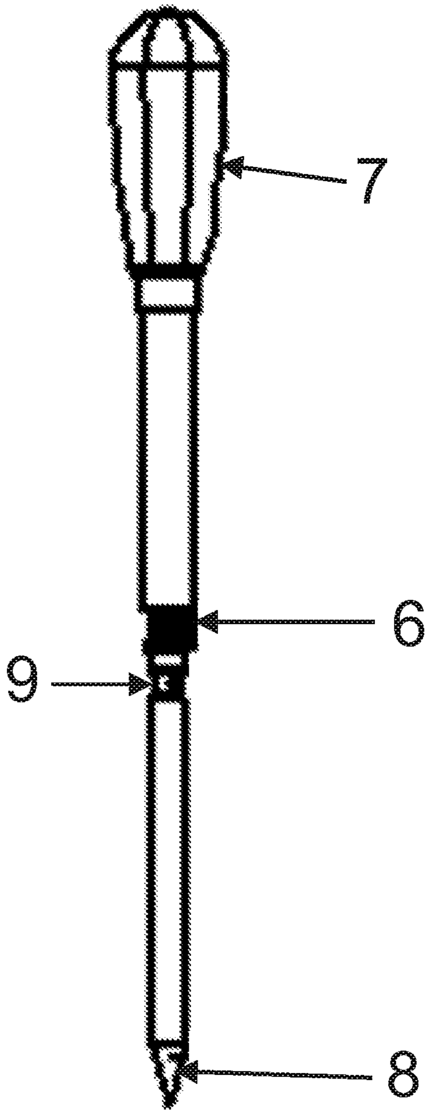

FIG. 4: Front schematic view of the drill shaft located on the trocar

Figure 5:
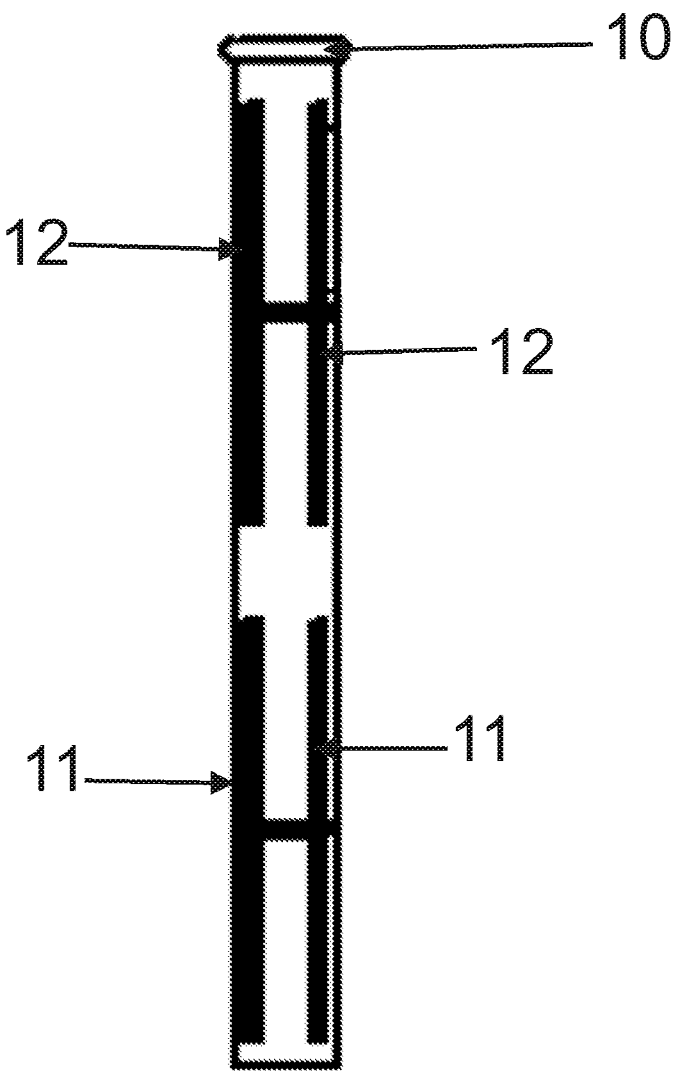

FIG. 5: Front schematic view of the outer tube located on the trocar

Figure 6:
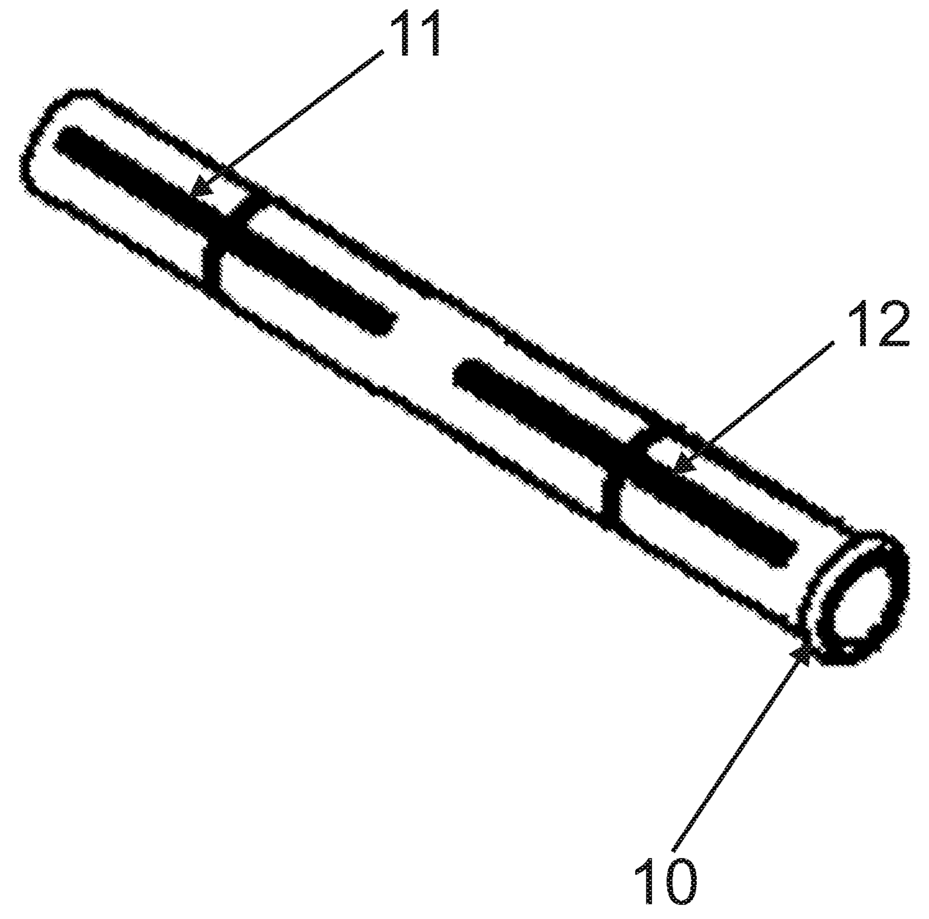

FIG. 6: Perspective view of the outer tube located on the trocar

Figure 7:
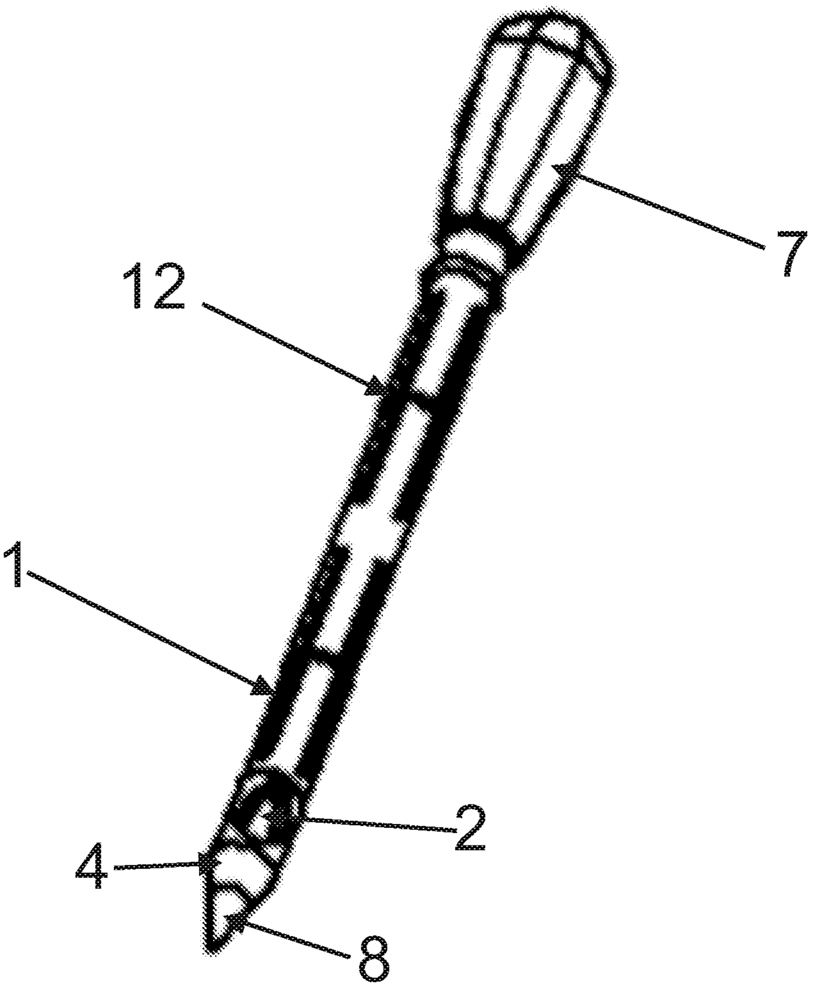

FIG. 7: Perspective view of the trocar that is the subject of the invention

Figure 8:
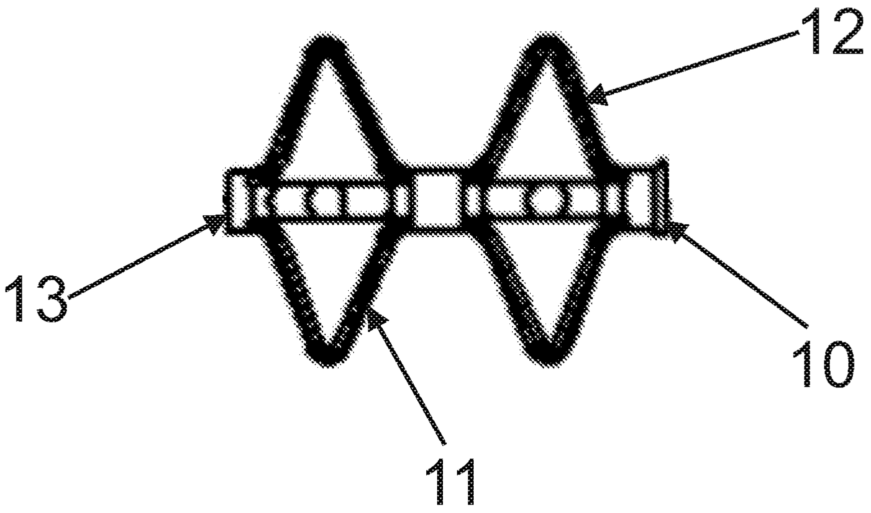
Figure 9:
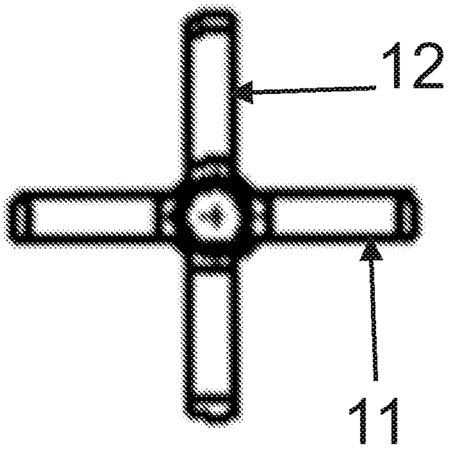
Figure 10:
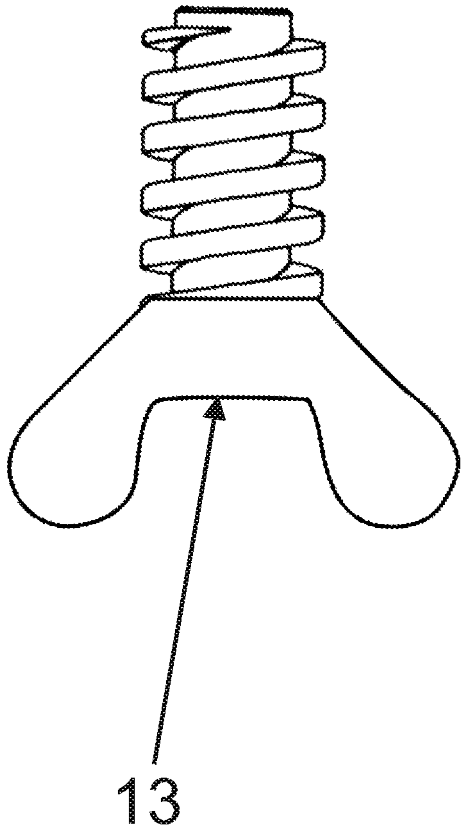

FIG. 8: Schematic view of the inflated slit flap I and slit flap II located on the trocar FIG. 9: Schematic top view of the inflated slit flap I and slit flap II located on the trocar FIG. 10: Front schematic view of the screw plug located on the trocar In the figures, the parts have been numbered one by one, and the numbers corresponding to these parts are given below.

1. Inner tube
2. Spare hole
3. Indent
4. Front hole
5. Female threads
6. Male threads
7. Drill shaft
8. Pointed end
9. Indent cavity
10. Outer tube
11. Slit flaps I
12. Slit flaps II
13. Screw plug The invention is a fixable degassing trocar characterized by comprising;

a spare hole (2) located on the inner tube (1), keeping the duct inside the inner tube (1) open in the event that the end of the inner tube (1) is blocked, indents (3) located on the inner tube (1) and movable over the inner tube (1), a front hole (4) located on the end of the inner tube (1), hollow capped drill shaft (7) assembled to the inner tube (1) by means of male threads (6) located on the end and female threads (5) located on the end of the inner tube (1), a pointed end (8) located on the end of the drill shaft (7) and that perforates the skin of the animal by extruding through the front end (4) with the pointed end (7) assembled to the inner tube (1), an indent cavity (9) located on the pointed end (7), allowing the movement of indents (3), a flexible outer tube (10) located on the drill shaft (7), slit flaps I (11) located on the surface of the flexible outer tube (10), which inflate inside the stomach of the animal with the drill shaft (7) and the outer tube (10) pulled in opposite directions, slit flaps II (12) located on the surface of the flexible outer tube (10), which inflate on the skin of the animal with the drill shaft (7) and the outer tube (10) pulled in opposite directions, screw plug (13) located on the end of the flexible outer tube (10) and used for the insertion of trocar cam, surgical instruments or digital probes.

The invention comprises spare lancet ends placed inside the hollow capped drill shaft (7) in order to cut the skin.

The flexible outer tube (10) is integrated from 10 mm behind the spare hole (2). The drill shaft (7) is fixed on the inner tube by means of the female thread (5) and the male thread (6). With the ready-to-use fixed degassing trocar inserted through a 10 mm incision made on the skin on the left iliac fossa and the inner tube (1) and the outer (10) fixed onto one another from the pointed drill end (8) and the gastric stump pulled in opposite directions, that is, the inner tube pulled outwards and the outer tube (10) pulled inwards, the slit flaps I (11) are inflated. The slit flaps II (12) on the skin are also inflated on the skin as do the slit flaps I (11) inside which allows a double-sided fixation.

The inner tube (1) comprises indents (3) in order to maintain the inflated form of the slit flaps I (11) and slit flaps II (12) located on the outer tube (10). The drill shaft (7) has indent cavities (9) that allow the movement of these indents (3).

The drill shaft (7) and the inner tube (1) are separated by the rotation of the female thread (5) and the male thread (6) in opposite directions. The cavity inside the inner tube (1) can be utilized for releasing gas and frothy gas as well as for the insertion of medication or instruments such as endoscopy cameras and pH meters. It can be closed with the screw plug (14) after the procedure in order to provide the micro anaerobic conditions necessary for the gastric microbiota.

The invention claimed is:

1. A trocar, comprising:

a drill shaft (7) having a first end portion and a second end portion, wherein the drill shaft (7) comprises a pointed end (8) at a tip of the first end portion of the drill shaft (7), an indent cavity (9) placed between the first end portion of the drill shaft (7) and the second end portion of the drill shaft (7) and a male thread adjacent to the indent cavity (9);

an inner tube (1) having a first end and a second end, the inner tube (1) comprises a female thread (5) at the first end of the inner tube (1), an indent (3) placed adjacent to the female thread (5) and a front hole (4) located at the second end of the inner tube (1), wherein, the inner tube (1) is detachably coupled to the drill shaft (7) through the female thread of the inner tube (1) and the male thread (6) of the drill shaft (7), and the pointed end (8) of the drill shaft (7) for perforating a skin of an animal by extruding through the front hole (4) of the inner tube (1), the indent (3) placed adjacent to the female thread (5) of the inner tube (1) moves over the inner tube (1), and the indent cavity (9) of the drill shaft (7) allows a movement of the indent (3); and a flexible outer tube (10), wherein the flexible outer tube (10) having a first end and a second end, the flexible outer tube (10) is placed on the drill shaft (7) and the inner tube (1) combined, the flexible outer tube (10) comprises a plurality of slit flaps (11,12) placed on a surface of the flexible outer tube (10) adjacent to each other, a first slit flap (11) of the plurality of slit flaps placed on the first end of the flexible outer tube (10) is configured to inflates inside a stomach of the animal and a second slit flap (12) of the plurality of slit flaps placed on the second end of the flexible outer tube (10) is configured to inflates on the skin of the animal, when the drill shaft (7) is pulled out from the outer tube (10), and the indent (3) placed on the inner tube (1) remains seated in a position defined by the indent cavity (9) and configured to hold the flexible outer tube (10) in place relative to the inner tube (1) and retains the first slit flap (11) configured to retain inside the stomach and the second slit flap (12) configured to retain on a skin side of the animal.

2. The trocar according to claim 1, further comprises a spare hole (2) located on the inner tube (1), for keeping a duct inside the inner tube (1) open when the front hole (4) of the inner tube (1) is blocked.

3. The trocar according to claim 1, further comprises a screw plug (13) located on a first end of the flexible outer tube (10) for the insertion of trocar cam, surgical instruments and digital probes.

* * * * *